US011967719B2

(12) United States Patent
Matsuo et al.

(10) Patent No.: US 11,967,719 B2
(45) Date of Patent: Apr. 23, 2024

(54) BINDER COMPOSITION FOR ALL-SOLID-STATE SECONDARY BATTERY, SLURRY COMPOSITION FOR ALL-SOLID-STATE SECONDARY BATTERY ELECTRODE MIXED MATERIAL LAYER, SLURRY COMPOSITION FOR ALL-SOLID-STATE SECONDARY BATTERY SOLID ELECTROLYTE LAYER, AND ALL-SOLID-STATE SECONDARY BATTERY

(71) Applicant: ZEON CORPORATION, Tokyo (JP)

(72) Inventors: Yusaku Matsuo, Tokyo (JP); Kenya Sonobe, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 565 days.

(21) Appl. No.: 17/268,957

(22) PCT Filed: Aug. 22, 2019

(86) PCT No.: PCT/JP2019/032834
§ 371 (c)(1),
(2) Date: Feb. 17, 2021

(87) PCT Pub. No.: WO2020/045226
PCT Pub. Date: Mar. 5, 2020

(65) Prior Publication Data
US 2021/0226221 A1 Jul. 22, 2021

(30) Foreign Application Priority Data
Aug. 31, 2018 (JP) .................................. 2018-163943

(51) Int. Cl.
*H01M 4/00* (2006.01)
*H01M 4/62* (2006.01)
*H01M 10/052* (2010.01)
*H01M 10/0562* (2010.01)

(52) U.S. Cl.
CPC ......... *H01M 4/622* (2013.01); *H01M 10/052* (2013.01); *H01M 10/0562* (2013.01); *H01M 2300/0068* (2013.01)

(58) Field of Classification Search
CPC ...... H01M 4/622; H01M 4/131; H01M 4/485; H01M 4/62; H01M 10/052; H01M 4/625; Y02E 60/10
See application file for complete search history.

(56) References Cited

U.S. PATENT DOCUMENTS

| 2004/0166417 A1 | 8/2004 | Nishio et al. |
| 2016/0297955 A1 | 10/2016 | Inoue et al. |
| 2017/0101498 A1 | 4/2017 | Tsukada et al. |
| 2019/0229339 A1 | 7/2019 | Maeda et al. |

FOREIGN PATENT DOCUMENTS

| EP | 3316360 A1 | 5/2018 | |
| JP | 2003012916 A | 1/2003 | |
| JP | 2003168416 A * | 6/2003 | ............. Y02E 60/12 |
| JP | 2012243476 A | 12/2012 | |
| JP | 5768815 B2 | 8/2015 | |
| TW | 201737540 A * | 10/2017 | ............. H01G 11/06 |
| WO | 2018047821 A1 | 3/2018 | |
| WO | WO-2018123624 A1 * | 7/2018 | .......... H01M 10/052 |

OTHER PUBLICATIONS

Mino et al., All Solid-Type Battery And Its Manufacturing Method, Jun. 2003, See the Abstract. (Year: 2003).*
Umetsu et al., Lithium Ion Secondary Battery, Oct. 2017, See the Abstract (Year: 2017).*
Annaka et al., Slurry Composition for Nonaqueous Secondary Cell Negative Electrode and Method for Manufacturing Same, Negative Electrode for Nonaqueous Secondary Cell, and Nonaqueous Secondary Cell, Jul. 2018, See the Abstract. (Year: 2018).*
May 9, 2022, the Extended European Search Report issued by the European Patent Office in the corresponding European Patent Application No. 19856174.8.
Oct. 8, 2019, International Search Report issued in the International Patent Application No. PCT/JP2019/032834.
Yoichi Tominaga et al., Effect of Humidity on Ionic Conductivity of NBR/Polyether Electrolyte Blends with Microscale Sea-Island Phase Separation, Journal of the Society of Rubber Science and Technology, Japan, 2009, pp. 499-506, vol. 82, Issue 12.
Mar. 2, 2021, International Preliminary Report on Patentability issued in the International Patent Application No. PCT/JP2019/032834.

* cited by examiner

Primary Examiner — Cynthia H Kelly
Assistant Examiner — Monique M Wills
(74) Attorney, Agent, or Firm — KENJA IP LAW PC

(57) ABSTRACT

Provided is a binder composition for an all-solid-state secondary battery with which it is possible to form a solid electrolyte-containing layer that can cause an all-solid-state secondary battery to display excellent output characteristics and high-temperature cycle characteristics. The binder composition contains a polymer A that includes a nitrile group-containing monomer unit and an aliphatic conjugated diene monomer unit. The proportional content of the nitrile group-containing monomer unit in the polymer A is not less than 5 mass % and not more than 30 mass %, and the proportional content of the aliphatic conjugated diene monomer unit in the polymer A is not less than 40 mass % and not more than 95 mass %. The polymer A has a Mooney viscosity ($ML_{1+4}$, 100° C.) of 65 or more.

11 Claims, No Drawings

BINDER COMPOSITION FOR ALL-SOLID-STATE SECONDARY BATTERY, SLURRY COMPOSITION FOR ALL-SOLID-STATE SECONDARY BATTERY ELECTRODE MIXED MATERIAL LAYER, SLURRY COMPOSITION FOR ALL-SOLID-STATE SECONDARY BATTERY SOLID ELECTROLYTE LAYER, AND ALL-SOLID-STATE SECONDARY BATTERY

TECHNICAL FIELD

The present disclosure relates to a binder composition for an all-solid-state secondary battery, a slurry composition for an all-solid-state secondary battery electrode mixed material layer, a slurry composition for an all-solid-state secondary battery solid electrolyte layer, and an all-solid-state secondary battery.

BACKGROUND

Demand for secondary batteries such as lithium ion secondary batteries has been increasing in recent years for various applications such as mobile information terminals, mobile electronic devices, and other mobile terminals, and also domestic small power storage devices, motorcycles, electric vehicles, and hybrid electric vehicles. The widespread use of secondary batteries in such applications has been accompanied by demand for further improvement of secondary battery safety.

All-solid-state secondary batteries in which a solid electrolyte is used instead of an organic solvent electrolyte having high flammability and high danger of ignition upon leakage are attracting attention as secondary batteries having high safety. A solid electrolyte may be contained inside an all-solid-state secondary battery as a solid electrolyte-containing layer (electrode mixed material layer and/or solid electrolyte layer) formed by binding components such as the solid electrolyte through a binder, for example.

In a typical all-solid-state secondary battery, a solid electrolyte layer is arranged between electrodes (positive electrode and negative electrode) that each include an electrode mixed material layer on a current collector. Moreover, a solid electrolyte-containing layer such as an electrode mixed material layer or a solid electrolyte layer is produced using a binder composition for an all-solid-state secondary battery that contains a polymer as a binder. More specifically, the formation of a solid electrolyte-containing layer is carried out using a slurry composition for a solid electrolyte-containing layer that is produced using a binder composition.

An electrode mixed material layer can be formed by drying a slurry composition for an all-solid-state secondary battery electrode mixed material layer (hereinafter, also referred to simply as a "slurry composition for an electrode mixed material layer") that contains a binder composition, a solid electrolyte, and an electrode active material, for example. Moreover, a solid electrolyte layer can be formed by drying a slurry composition for an all-solid-state secondary battery solid electrolyte layer (hereinafter, also referred to simply as a "slurry composition for a solid electrolyte layer") that contains a binder composition and a solid electrolyte, for example.

Attempts have been made to improve the performance of all-solid-state secondary batteries through improvement of binders contained in binder compositions.

In one specific example, Patent Literature (PTL) 1 discloses that output characteristics and high-temperature cycle characteristics of an all-solid-state secondary battery including a solid electrolyte-containing layer are enhanced by forming the solid electrolyte-containing layer using, as a binder, a polymer that includes a nitrile group-containing polymerization unit in a proportion of 2 mass % to 30 mass % and that has an iodine value of not less than 0 mg/100 mg and not more than 30 mg/100 mg.

CITATION LIST

Patent Literature

PTL 1: JP5768815B2

SUMMARY

Technical Problem

However, there is room for improvement of a binder composition containing the conventional binder described above in terms of further improving output characteristics and high-temperature cycle characteristics of an all-solid-state secondary battery.

Accordingly, one object of the present disclosure is to provide a binder composition for an all-solid-state secondary battery with which it is possible to form a solid electrolyte-containing layer that can cause an all-solid-state secondary battery to display excellent output characteristics and high-temperature cycle characteristics.

Another object of the present disclosure is to provide a slurry composition for an all-solid-state secondary battery electrode mixed material layer with which it is possible to form an electrode mixed material layer that can cause an all-solid-state secondary battery to display excellent output characteristics and high-temperature cycle characteristics.

Another object of the present disclosure is to provide a slurry composition for an all-solid-state secondary battery solid electrolyte layer with which it is possible to form a solid electrolyte layer that can cause an all-solid-state secondary battery to display excellent output characteristics and high-temperature cycle characteristics.

Another object of the present disclosure is to provide an all-solid-state secondary battery having excellent output characteristics and high-temperature cycle characteristics.

Solution to Problem

The inventors conducted diligent investigation with the aim of solving the problem set forth above. The inventors discovered that when a polymer that includes a nitrile group-containing monomer unit and an aliphatic conjugated diene monomer unit in proportions that are within specific ranges and that has a Mooney viscosity of not less than a specific value is used as a binder in formation of a solid electrolyte-containing layer such as an electrode mixed material layer or a solid electrolyte layer, it is possible to cause an all-solid-state secondary battery to display excellent output characteristics and high-temperature cycle characteristics, and, in this manner, completed the present disclosure.

Specifically, the present disclosure aims to advantageously solve the problem set forth above, and a presently disclosed binder composition for an all-solid-state secondary battery comprises a polymer A, wherein the polymer A includes a nitrile group-containing monomer unit and an aliphatic conjugated diene monomer unit, with proportional content of the nitrile group-containing monomer unit in the polymer A being not less than 5 mass % and not more than 30 mass % and proportional content of the aliphatic conjugated diene monomer unit in the polymer A being not less than 40 mass % and not more than 95 mass %, and the polymer A has a Mooney viscosity ($ML_{1+4}$, 100° C.) of 65 or more. By using a binder composition containing the polymer A that includes a nitrile group-containing monomer unit and an aliphatic conjugated diene monomer unit in proportions that are within the ranges set forth above and that has a Mooney viscosity of not less than the value set forth above in this manner, it is possible to form a solid electrolyte-containing layer (electrode mixed material layer or solid electrolyte layer) that can cause an all-solid-state secondary battery to display excellent output characteristics and high-temperature cycle characteristics.

The phrase "includes a monomer unit" as used in the present disclosure means that "a polymer obtained with the monomer includes a repeating unit derived from the monomer". The proportion in which a polymer includes each constituent repeating unit (monomer unit) thereof can be measured by a nuclear magnetic resonance (NMR) method such as $^1$H-NMR or $^{13}$C-NMR.

Moreover, the "Mooney viscosity ($ML_{1+4}$, 100° C.)" of a polymer referred to in the present disclosure can be measured in accordance with JIS K6300-1.

In the presently disclosed binder composition for an all-solid-state secondary battery, proportional content of an ethylenically unsaturated carboxylic acid ester monomer unit in the polymer A is preferably not less than 0 mass % and not more than 50 mass %. When the proportional content of an ethylenically unsaturated carboxylic acid ester monomer unit in the polymer A is within the range set forth above, output characteristics of an all-solid-state secondary battery can be further improved.

In the presently disclosed binder composition for an all-solid-state secondary battery, the polymer A preferably has an iodine value of more than 30 mg/100 mg. When the iodine value of the polymer A exceeds the value set forth above, output characteristics and high-temperature cycle characteristics of an all-solid-state secondary battery can be further improved.

Note that the "iodine value" of a polymer referred to in the present disclosure can be measured in accordance with JIS K6235(2006).

It is preferable that the presently disclosed binder composition for an all-solid-state secondary battery further comprises a solvent and that the solvent includes either or both of xylene and butyl butyrate. When a binder composition containing xylene and/or butyl butyrate as a solvent is used, adhesiveness and flexural resistance of a solid electrolyte-containing layer can be increased while also further improving output characteristics and high-temperature cycle characteristics of an all-solid-state secondary battery.

Moreover, the present disclosure aims to advantageously solve the problem set forth above, and a presently disclosed slurry composition for an all-solid-state secondary battery electrode mixed material layer comprises: a solid electrolyte; an electrode active material; and any one of the binder compositions for an all-solid-state secondary battery set forth above. By using a slurry composition for an electrode mixed material layer that contains a solid electrolyte, an electrode active material, and any one of the binder compositions set forth above in this manner, it is possible to form an electrode mixed material layer that can cause an all-solid-state secondary battery to display excellent output characteristics and high-temperature cycle characteristics.

In the presently disclosed slurry composition for an all-solid-state secondary battery electrode mixed material layer, the solid electrolyte is preferably an amorphous sulfide containing Li and P. By using an amorphous sulfide containing Li and P as the solid electrolyte, output characteristics of an all-solid-state secondary battery can be further improved.

In the presently disclosed slurry composition for an all-solid-state secondary battery electrode mixed material layer, the solid electrolyte is preferably sulfide glass formed of $Li_2S$ and $P_2S_5$. By using sulfide glass formed of $Li_2S$ and $P_2S_5$ as the solid electrolyte, output characteristics of an all-solid-state secondary battery can be even further improved.

Furthermore, the present disclosure aims to advantageously solve the problem set forth above, and a presently disclosed slurry composition for an all-solid-state secondary battery solid electrolyte layer comprises: a solid electrolyte; and any one of the binder compositions for an all-solid-state secondary battery set forth above. By using a slurry composition for a solid electrolyte layer that contains a solid electrolyte and any one of the binder compositions set forth above in this manner, it is possible to form a solid electrolyte layer that can cause an all-solid-state secondary battery to display excellent output characteristics and high-temperature cycle characteristics.

In the presently disclosed slurry composition for an all-solid-state secondary battery solid electrolyte layer, the solid electrolyte is preferably an amorphous sulfide containing Li and P. By using an amorphous sulfide containing Li and P as the solid electrolyte, output characteristics of an all-solid-state secondary battery can be further improved.

In the presently disclosed slurry composition for an all-solid-state secondary battery solid electrolyte layer, the solid electrolyte is preferably sulfide glass formed of $Li_2S$ and $P_2S_5$. By using sulfide glass formed of $Li_2S$ and $P_2S_5$ as the solid electrolyte, output characteristics of an all-solid-state secondary battery can be even further improved.

Also, the present disclosure aims to advantageously solve the problem set forth above, and a presently disclosed all-solid-state secondary battery comprises either or both of: an electrode including an electrode mixed material layer formed using any one of the slurry compositions for an all-solid-state secondary battery electrode mixed material layer set forth above; and a solid electrolyte layer formed using any one of the slurry compositions for an all-solid-state secondary battery solid electrolyte layer set forth above. By forming either or both of these solid electrolyte-containing layers using a slurry composition for a solid electrolyte-containing layer that contains the binder composition set forth above in this manner, the all-solid-state secondary battery can be caused to display excellent output characteristics and high-temperature cycle characteristics.

Advantageous Effect

According to the present disclosure, it is possible to provide a binder composition for an all-solid-state secondary battery with which it is possible to form a solid electrolyte-containing layer that can cause an all-solid-state secondary battery to display excellent output characteristics and high-temperature cycle characteristics.

Moreover, according to the present disclosure, it is possible to provide a slurry composition for an all-solid-state secondary battery electrode mixed material layer with which it is possible to form an electrode mixed material layer that can cause an all-solid-state secondary battery to display excellent output characteristics and high-temperature cycle characteristics.

Furthermore, according to the present disclosure, it is possible to provide a slurry composition for an all-solid-state secondary battery solid electrolyte layer with which it is possible to form a solid electrolyte layer that can cause an all-solid-state secondary battery to display excellent output characteristics and high-temperature cycle characteristics.

Also, according to the present disclosure, it is possible to provide an all-solid-state secondary battery having excellent output characteristics and high-temperature cycle characteristics.

DETAILED DESCRIPTION

The following provides a detailed description of embodiments of the present disclosure.

The presently disclosed binder composition for an all-solid-state secondary battery can be used in production of an all-solid-state secondary battery. For example, the presently disclosed binder composition for an all-solid-state secondary battery can be used in production of a slurry composition for a solid electrolyte-containing layer (slurry composition for an all-solid-state secondary battery electrode mixed material layer and/or slurry composition for an all-solid-state secondary battery solid electrolyte layer) that is used to produce a solid electrolyte-containing layer (electrode mixed material layer and/or solid electrolyte layer) included in an all-solid-state secondary battery. Moreover, the presently disclosed slurry composition for an all-solid-state secondary battery electrode mixed material layer contains the presently disclosed binder composition for an all-solid-state secondary battery and can be used in formation of an electrode mixed material layer. Furthermore, the presently disclosed slurry composition for an all-solid-state secondary battery solid electrolyte layer contains the presently disclosed binder composition for an all-solid-state secondary battery and can be used in formation of a solid electrolyte layer. Also, the presently disclosed all-solid-state secondary battery is an all-solid-state secondary battery in which a slurry composition for a solid electrolyte-containing layer containing the presently disclosed binder composition for an all-solid-state secondary battery has been used to form at least one solid electrolyte-containing layer among a positive electrode mixed material layer, a negative electrode mixed material layer, and a solid electrolyte layer.

(Binder Composition for all-Solid-State Secondary Battery)

The presently disclosed binder composition contains at least a binder and can optionally further contain a solvent and other components. Moreover, the presently disclosed binder composition contains, as the binder, a polymer A that includes a nitrile group-containing monomer unit in a proportion of not less than 5 mass % and not more than 30 mass %, that includes an aliphatic conjugated diene monomer unit in a proportion of not less than 40 mass % and not more than 95 mass %, and that has a Mooney viscosity of 65 or more.

Through the presently disclosed binder composition containing the polymer A set forth above, it is possible to form a solid electrolyte-containing layer (electrode mixed material layer and/or solid electrolyte layer) that can cause an all-solid-state secondary battery to display excellent output characteristics and high-temperature cycle characteristics.

Although it is not clear why it is possible to form a solid electrolyte-containing layer that can cause an all-solid-state secondary battery to display excellent output characteristics and high-temperature cycle characteristics using the presently disclosed binder composition, the reason for this is presumed to be as follows.

Specifically, adsorption ability to a solid electrolyte of the polymer A contained in the presently disclosed binder composition as a binder is ensured through the polymer A including a nitrile group-containing monomer unit in a proportion of 5 mass % or more, whereas solubility of the polymer A in a solvent contained in a slurry composition for a solid electrolyte-containing layer is ensured due to the proportional content of the nitrile group-containing monomer unit being 30 mass % or less. Therefore, the polymer A can dissolve in a solvent while also adsorbing well to a solid electrolyte and increasing dispersibility of the solid electrolyte in a slurry composition for a solid electrolyte-containing layer as a result of the polymer A including a nitrile group-containing monomer unit in a proportion of not less than 5 mass % and not more than 30 mass %. Moreover, the slurry composition for a solid electrolyte-containing layer in which the solid electrolyte is well dispersed makes it possible to form a solid electrolyte-containing layer having the solid electrolyte distributed well throughout the layer.

The aliphatic conjugated diene monomer unit included in the polymer A serving as the binder is a repeating unit that can impart flexibility to the polymer A. In other words, as a result of the polymer A including the aliphatic conjugated diene monomer unit in a proportion of 40 mass % or more, the polymer A has a suitable degree of flexibility, and flexural resistance of a solid electrolyte-containing layer formed from a slurry composition for a solid electrolyte-containing layer that contains the binder composition can be ensured. On the other hand, reduction of adhesiveness of a solid electrolyte-containing layer caused by reduction of strength of the polymer A can be inhibited as a result of the proportional content of the aliphatic conjugated diene monomer unit being 95 mass % or less.

Furthermore, the polymer A serving as the binder has excellent flexibility and binding capacity as a result of having a Mooney viscosity of 65 or more.

As a result of the polymer A serving as the binder including a nitrile group-containing monomer unit and an aliphatic conjugated diene monomer unit in proportions that are within the ranges set forth above and having a Mooney viscosity that is not less than the value set forth above in this manner, it is possible to form a solid electrolyte-containing layer that has excellent flexural resistance and adhesiveness while also having a solid electrolyte distributed well throughout the layer. Such a solid electrolyte-containing layer is thought to be able to enhance battery characteristics (output characteristics and high-temperature cycle characteristics) of an all-solid-state secondary battery.

<Binder>

The presently disclosed binder composition contains a polymer A that includes a nitrile group-containing monomer unit and an aliphatic conjugated diene monomer unit in proportions within specific ranges and that has a Mooney viscosity of not less than a specific value as a binder as previously described. Note that the presently disclosed binder composition may contain binders other than the polymer A (i.e., other binders).

<<Chemical Composition of Polymer A>>

[Nitrile Group-Containing Monomer Unit]

Examples of nitrile group-containing monomers that can form the nitrile group-containing monomer unit include α,β-ethylenically unsaturated nitrile monomers. Specifically, any α,β-ethylenically unsaturated compound that has a nitrile group can be used as an α,β-ethylenically unsaturated nitrile monomer without any specific limitations. Examples include acrylonitrile; α-halogenoacrylonitriles such as α-chloroacrylonitrile and α-bromoacrylonitrile; and α-alkylacrylonitriles such as methacrylonitrile and α-ethylacrylonitrile. Of these nitrile group-containing monomers, acrylonitrile and methacrylonitrile are preferable from a viewpoint of further improving output characteristics and high-temperature cycle characteristics of an all-solid-state secondary battery, with acrylonitrile being more preferable. Note that one nitrile group-containing monomer may be used individually, or two or more nitrile group-containing monomers may be used in combination in a freely selected ratio.

The proportional content of the nitrile group-containing monomer unit in the polymer A when the amount of all repeating units included in the polymer A is taken to be 100 mass % is required to be not less than 5 mass % and not more than 30 mass %, is preferably 8 mass % or more, and more preferably 12 mass % or more, and is preferably 28 mass % or less, more preferably 26 mass % or less, and even more preferably 20 mass % or less. When the proportional content of the nitrile group-containing monomer unit in the polymer A is less than 5 mass %, a slurry composition for a solid electrolyte-containing layer in which a solid electrolyte is well dispersed cannot be produced due to reduction of binding capacity of the polymer A. This results in deterioration of output characteristics and high-temperature cycle characteristics of an all-solid-state secondary battery that includes a solid electrolyte-containing layer formed using the slurry composition for a solid electrolyte-containing layer. On the other hand, when the proportional content of the nitrile group-containing monomer unit in the polymer A is more than 30 mass %, a slurry composition for a solid electrolyte-containing layer in which a solid electrolyte is well dispersed cannot be produced due to reduction of solubility of the polymer A in a solvent. This results in deterioration of output characteristics and high-temperature cycle characteristics of an all-solid-state secondary battery that includes a solid electrolyte-containing layer formed using the slurry composition for a solid electrolyte-containing layer.

[Aliphatic Conjugated Diene Monomer Unit]

Examples of aliphatic conjugated diene monomers that can form the aliphatic conjugated diene monomer unit include, but are not specifically limited to, 1,3-butadiene, 2-methyl-1,3-butadiene (isoprene), and 2,3-dimethyl-1,3-butadiene. Of these aliphatic conjugated diene monomers, 1,3-butadiene is preferable from a viewpoint of ensuring sufficient flexibility of a solid electrolyte-containing layer while also further improving output characteristics and high-temperature cycle characteristics of an all-solid-state secondary battery. Note that one aliphatic conjugated diene monomer may be used individually, or two or more aliphatic conjugated diene monomers may be used in combination in a freely selected ratio.

The proportional content of the aliphatic conjugated diene monomer unit in the polymer A when the amount of all repeating units included in the polymer A is taken to be 100 mass % is required to be not less than 40 mass % and not more than 95 mass %, is preferably 45 mass % or more, more preferably 55 mass % or more, and even more preferably 60 mass % or more, and is preferably 92 mass % or less, and more preferably 88 mass % or less. When the proportional content of the aliphatic conjugated diene monomer unit in the polymer A is less than 40 mass %, good flexural resistance cannot be imparted to a solid electrolyte-containing layer due to reduction of flexibility of the polymer A. This results in deterioration of output characteristics and high-temperature cycle characteristics of an all-solid-state secondary battery that includes the solid electrolyte-containing layer. On the other hand, when the proportional content of the aliphatic conjugated diene monomer unit in the polymer A is more than 95 mass %, good adhesiveness cannot be imparted to a solid electrolyte-containing layer due to reduction of strength of the polymer A. This results in deterioration of output characteristics and high-temperature cycle characteristics of an all-solid-state secondary battery that includes the solid electrolyte-containing layer.

[Other Repeating Units]

The polymer A may include repeating units other than the nitrile group-containing monomer unit and the aliphatic conjugated diene monomer unit set forth above (i.e., other repeating units). Any repeating unit derived from a monomer that is copolymerizable with a nitrile group-containing monomer and an aliphatic conjugated diene monomer such as described above can be included as another repeating unit without any specific limitations. For example, an ethylenically unsaturated carboxylic acid ester monomer unit may be included as another repeating unit.

Examples of ethylenically unsaturated carboxylic acid ester monomers that can form the ethylenically unsaturated carboxylic acid ester monomer unit include a monomer formed of an ester of an ethylenically unsaturated monocarboxylic acid and a monomer formed of a diester of an ethylenically unsaturated dicarboxylic acid.

The monomer formed of an ester of an ethylenically unsaturated monocarboxylic acid may be a (meth)acrylic acid ester monomer, for example. Note that in the present disclosure, "(meth)acryl" is used to indicate "acryl" and/or "methacryl".

Examples of (meth)acrylic acid ester monomers include acrylic acid alkyl esters such as methyl acrylate, ethyl acrylate, n-propyl acrylate, isopropyl acrylate, n-butyl acrylate, t-butyl acrylate, isobutyl acrylate, n-pentyl acrylate, isopentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, n-butyl methacrylate, t-butyl methacrylate, isobutyl methacrylate, n-pentyl methacrylate, isopentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, stearyl methacrylate, and glycidyl methacrylate.

The monomer formed of a diester of an ethylenically unsaturated dicarboxylic acid may be a maleic acid dialkyl ester such as diethyl maleate or dibutyl maleate; a fumaric acid dialkyl ester such as diethyl fumarate or dibutyl fumarate; an itaconic acid dialkyl ester such as diethyl itaconate or dibutyl itaconate; or the like.

Of these ethylenically unsaturated carboxylic acid ester monomers, methyl acrylate, ethyl acrylate, methyl methacrylate, n-butyl acrylate, and dibutyl itaconate are preferable from a viewpoint of further improving output characteristics and high-temperature cycle characteristics of an all-solid-state secondary battery. Note that one ethylenically unsaturated carboxylic acid ester monomer may be used individually, or two or more ethylenically unsaturated carboxylic acid ester monomers may be used in combination in a freely selected ratio.

The proportional content of the ethylenically unsaturated carboxylic acid ester monomer unit in the polymer A when the amount of all repeating units included in the polymer A is taken to be 100 mass % is 0 mass % or more, can be 5 mass % or more, and can be 10 mass % or more, and is preferably 50 mass % or less, more preferably 45 mass % or less, and even more preferably 40 mass % or less. When the proportional content of the ethylenically unsaturated carboxylic acid ester monomer unit in the polymer A is 50 mass % or less, a slurry composition for a solid electrolyte-containing layer in which a solid electrolyte is well dispersed can be produced using the binder composition. Moreover, an all-solid-state secondary battery that includes a solid electrolyte-containing layer formed using the slurry composition for a solid electrolyte-containing layer can be caused to display sufficiently good output characteristics.

<<Production Method of Polymer A>>

No specific limitations are placed on the method by which the polymer A is produced. For example, the polymer A may be produced through polymerization of a monomer composition containing the monomers set forth above, carried out in an aqueous solvent. Note that the proportional content of each monomer in the monomer composition can be set in accordance with the desired proportional content of each monomer unit (repeating unit) in the polymer A.

The polymerization method is not specifically limited and may, for example, be any of solution polymerization, suspension polymerization, bulk polymerization, and emulsion polymerization. Also, ionic polymerization, radical polymerization, living radical polymerization, various types of condensation polymerization, addition polymerization, or the like can be adopted as the polymerization reaction. Moreover, a known emulsifier and/or polymerization initiator can be used in the polymerization as necessary.

<<Properties of Polymer A>>

[Mooney Viscosity]

The Mooney viscosity ($ML_{1+4}$, 100° C.) of the polymer A is required to be 65 or more, is preferably 67 or more, more preferably 70 or more, and even more preferably 75 or more, and is preferably less than 200, more preferably less than 180, and even more preferably less than 150. When the Mooney viscosity of the polymer A is less than 65, binding capacity and flexibility of the polymer A decrease, and a solid electrolyte-containing layer having excellent adhesiveness and flexural resistance cannot be formed through a slurry composition for a solid electrolyte-containing layer that is produced using the binder composition containing the polymer A. Consequently, it is not possible to cause an all-solid-state secondary battery to display excellent output characteristics and high-temperature cycle characteristics even using this solid electrolyte-containing layer. On the other hand, when the Mooney viscosity of the polymer A is less than 200, the polymer A is not excessively rigid, and it is possible to form a solid electrolyte-containing layer in which sufficient adhesiveness and flexural resistance are ensured through a slurry composition for a solid electrolyte-containing layer that is produced using the binder composition containing the polymer A. Consequently, output characteristics and high-temperature cycle characteristics of an all-solid-state secondary battery can be further improved.

Note that the Mooney viscosity of the polymer A can be adjusted by, for example, altering the types and proportions of monomers used to produce the polymer A and the production method of the polymer A (used amount of molecular weight modifier, polymerization temperature, polymer conversion rate at end of polymerization, etc.).

[Iodine Value]

The iodine value of the polymer A is preferably more than 30 mg/100 mg, more preferably 100 mg/100 mg or more, even more preferably 200 mg/100 mg or more, further preferably 250 mg/100 mg or more, and particularly preferably 280 mg/100 mg or more. When the iodine value of the polymer A is more than 30 mg/100 mg, it is presumed that adhesiveness and flexural resistance of an obtained solid electrolyte-containing layer can be increased in a good balance due to the glass-transition temperature and elastic modulus of the polymer A rising, and that, as a result, output characteristics and high-temperature cycle characteristics of an all-solid-state secondary battery can be further improved. The upper limit for the iodine value of the polymer A is not specifically limited and can be set as 500 mg/100 mg or less.

Note that the iodine value of the polymer A can be adjusted by, for example, altering the types and proportions of monomers used to produce the polymer A and the production method of the polymer A (for example, the presence or absence of hydrogenation treatment).

<<Other Binders>>

Any polymeric compound such as a fluoropolymer, a diene polymer, or a nitrile polymer can be used as another binder without any specific limitations so long as it differs from the polymer A in terms of chemical composition and/or properties.

Examples of fluoropolymers, diene polymers, and nitrile polymers that can be used include fluoropolymers, diene polymers, nitrile polymers, and the like described in JP2012-243476A, for example.

One of the polymeric compounds described above may be used individually as another binder, or a plurality of the polymeric compounds may be used in combination as other binders.

<Solvent>

The solvent that can optionally be contained in the presently disclosed binder composition is not specifically limited and can, for example, be an alicyclic hydrocarbon such as cyclopentane or cyclohexane; an aromatic hydrocarbon such as toluene or xylene; butyl butyrate; diisobutyl ketone; or n-butyl ether. One of these solvents may be used individually, or two or more of these solvents may be used as a mixture. Of these solvents, xylene and butyl butyrate are preferable from a viewpoint of increasing adhesiveness and flexural resistance of a solid electrolyte-containing layer while also further improving output characteristics and high-temperature cycle characteristics of an all-solid-state secondary battery.

<Other Components>

Examples of other components that can optionally be contained in the presently disclosed binder composition include dispersants, leveling agents, defoamers, conductive materials, and reinforcing materials. Moreover, a lithium salt may be used as another component in a case in which the all-solid-state secondary battery is an all-solid-state lithium ion secondary battery, for example. These other components are not specifically limited so long as they do not affect battery reactions.

<Production Method of Binder Composition>

No specific limitations are placed on the method by which the presently disclosed binder composition is produced. For example, the binder composition can be produced by subjecting a water dispersion of the polymer A serving as the binder that is obtained as previously described to solvent replacement, addition of other binders and other components, and so forth as necessary.

(Slurry Composition for all-Solid-State Secondary Battery Electrode Mixed Material Layer)

The presently disclosed slurry composition for an electrode mixed material layer contains a solid electrolyte, an electrode active material, and the presently disclosed binder composition set forth above. More specifically, the presently disclosed slurry composition for an electrode mixed material layer is a composition in which a solid electrolyte, an electrode active material, a binder including the previously described polymer A, and other optionally contained components (optional components) are dispersed and/or dissolved in a solvent.

When the presently disclosed slurry composition for an electrode mixed material layer is used to produce an electrode mixed material layer, an electrode that includes the electrode mixed material layer can cause an all-solid-state secondary battery to display excellent output characteristics and high-temperature cycle characteristics as a result of the presently disclosed slurry composition for an electrode mixed material layer containing the presently disclosed binder composition.

<Solid Electrolyte>

The solid electrolyte can be either of an inorganic solid electrolyte and a polymeric solid electrolyte without any specific limitations so long as it can conduct charge carriers such as lithium ions. Also note that the solid electrolyte may be a mixture of an inorganic solid electrolyte and a polymeric solid electrolyte.

<<Inorganic Solid Electrolyte>>

Crystalline inorganic ion conductors, amorphous inorganic ion conductors, and mixtures thereof can be used as inorganic solid electrolytes without any specific limitations. In a case in which the all-solid-state secondary battery is an all-solid-state lithium ion secondary battery, for example, a crystalline inorganic lithium ion conductor, an amorphous inorganic lithium ion conductor, or a mixture thereof is normally used as an inorganic solid electrolyte.

Although the following describes, as one example, a case in which the slurry composition for an all-solid-state secondary battery electrode mixed material layer is a slurry composition for an all-solid-state lithium ion secondary battery electrode mixed material layer, the presently disclosed slurry composition for an all-solid-state secondary battery electrode mixed material layer is not limited to the following example.

Examples of crystalline inorganic lithium ion conductors include $Li_3N$, LISICON ($Li_{14}Zn(GeO_4)_4$), perovskite-type $Li_{0.5}La_{0.5}TiO_3$, garnet-type $Li_7La_3Zr_2O_{10}$, UPON ($Li_{3+y}PO_{4-x}N_x$), and Thio-LISICON ($Li_{3.75}Ge_{0.25}P_{0.75}S_4$).

Examples of amorphous inorganic lithium ion conductors include glass Li—Si—S—O and Li—P—S.

Of the examples given above, an amorphous inorganic lithium ion conductor is preferable as an inorganic solid electrolyte for an all-solid-state lithium ion secondary battery from a viewpoint of electrical conductivity, with an amorphous sulfide containing Li and P being more preferable. An amorphous sulfide containing Li and P has high lithium ion conductivity, and thus can reduce internal resistance and improve output characteristics of a battery in which the amorphous sulfide is used as an inorganic solid electrolyte.

The amorphous sulfide containing Li and P is more preferably sulfide glass formed of $Li_2S$ and $P_2S_5$, and particularly preferably sulfide glass produced from a mixed raw material of $Li_2S$ and $P_2S_5$ in which the molar ratio of $Li_2S:P_2S_5$ is 65:35 to 85:15 from a viewpoint of reducing internal resistance and improving output characteristics of a battery. Moreover, the amorphous sulfide containing Li and P is preferably sulfide glass-ceramic obtained by reacting a mixed raw material of $Li_2S$ and $P_2S_5$ in which the molar ratio of $Li_2S:P_2S_5$ is 65:35 to 85:15 by a mechanochemical method. From a viewpoint of maintaining a state of high lithium ion conductivity, the molar ratio of $Li_2S:P_2S_5$ in the mixed raw material is preferably 68:32 to 80:20.

The lithium ion conductivity of an inorganic solid electrolyte for an all-solid-state lithium ion secondary battery is not specifically limited but is preferably $1\times10^{-4}$ S/cm or more, and more preferably $1\times10^{-3}$ S/cm or more.

Note that the inorganic solid electrolyte may contain one or more sulfides selected from the group consisting of $Al_2S_3$, $B_2S_3$, and $SiS_2$ as a starting material other than $Li_2S$ and $P_2S_5$ to the extent that ion conductivity is not reduced. The addition of such a sulfide can stabilize a glass component in the inorganic solid electrolyte.

In the same manner, the inorganic solid electrolyte may contain one or more ortho-oxoacid lithium salts selected from the group consisting of $Li_3PO_4$, $Li_4SiO_4$, $Li_4GeO_4$, $Li_3BO_3$, and $Li_3AlO_3$, in addition to $Li_2S$ and $P_2S_5$. The inclusion of such an ortho-oxoacid lithium salt can stabilize a glass component in the inorganic solid electrolyte.

The number-average particle diameter of the inorganic solid electrolyte is preferably 0.1 μm or more, and more preferably 0.3 μm or more, and is preferably 20 μm or less, more preferably 10 μm or less, even more preferably 7 μm or less, and particularly preferably 5 μm or less. When the number-average particle diameter of the inorganic solid electrolyte is 0.1 μm or more, handling is facilitated, and adhesiveness of an electrode mixed material layer formed using the slurry composition for an electrode mixed material layer can be sufficiently increased. On the other hand, when the number-average particle diameter of the inorganic solid electrolyte is 20 μm or less, sufficient surface area of the inorganic solid electrolyte can be ensured, and output characteristics of an all-solid-state secondary battery can be sufficiently improved.

Note that the "number-average particle diameter" of an inorganic solid electrolyte or an electrode active material referred to in the present disclosure can be determined by measuring the diameters of 100 particles of the inorganic solid electrolyte or the electrode active material in accordance with JIS Z8827-1:2008, through observation under an electron microscope, and then calculating an average value of the measured particle diameters.

<<Polymeric Solid Electrolyte>>

The polymeric solid electrolyte may be a polymeric solid electrolyte obtained through inclusion of an electrolyte salt in a polyethylene oxide derivative, a polymer including a polyethylene oxide derivative, a polypropylene oxide derivative, a polymer including a polypropylene oxide derivative, a phosphoric acid ester polymer, a polycarbonate derivative, a polymer including a polycarbonate derivative, or the like.

In a case in which the all-solid-state secondary battery is an all-solid-state lithium ion secondary battery, for example, examples of electrolyte salts that can be used include, but are not specifically limited to, fluorine-containing lithium salts such as lithium hexafluorophosphate ($LiPF_6$), lithium tetrafluoroborate ($LiBF_4$), and lithium bis(trifluoromethanesulfonyl)imide (LiTFSI).

<<Electrode Active Material>>

The electrode active material is a material that gives and receives electrons in an electrode of an all-solid-state secondary battery. In a case in which the all-solid-state secondary battery is an all-solid-state lithium ion secondary battery, for example, the electrode active material is normally a material that can occlude and release lithium.

Although the following describes, as one example, a case in which the slurry composition for an all-solid-state secondary battery electrode mixed material layer is a slurry composition for an all-solid-state lithium ion secondary battery electrode mixed material layer, the presently disclosed slurry composition for an all-solid-state secondary battery electrode mixed material layer is not limited to the following example.

A positive electrode active material for an all-solid-state lithium ion secondary battery may be a positive electrode active material formed of an inorganic compound or a positive electrode active material formed of an organic compound without any specific limitations. Also note that the positive electrode active material may be a mixture of an inorganic compound and an organic compound.

Examples of positive electrode active materials formed of inorganic compounds include transition metal oxides, complex oxides of lithium and a transition metal (lithium-containing complex metal oxides), and transition metal sulfides. The aforementioned transition metal may be Fe, Co, Ni, Mn, or the like. Specific examples of inorganic compounds that can be used as the positive electrode active material include lithium-containing complex metal oxides such as a lithium-containing complex metal oxide of Co—Ni—Mn (Li(Co Mn Ni)$O_2$), a lithium-containing complex metal oxide of Ni—Co—Al, lithium-containing cobalt oxide (LiCoO$_2$), lithium-containing nickel oxide (LiNiO$_2$), lithium manganate (LiMnO$_2$, LiMn$_2$O$_4$), olivine-type lithium iron phosphate (LiFePO$_4$), and LiFeVO$_4$; transition metal sulfides such as TiS$_2$, TiS$_3$, and amorphous MoS$_2$; and transition metal oxides such as Cu$_2$V$_2$O$_3$, amorphous V$_2$O—P$_2$O$_5$, MoO$_3$, V$_2$O$_5$, and V$_6$O$_{13}$. These compounds may have undergone partial element substitution.

Examples of positive electrode active materials formed of organic compounds include polyaniline, polypyrrole, polyacenes, disulfide compounds, polysulfide compounds, and N-fluoropyridinium salts.

A negative electrode active material for an all-solid-state lithium ion secondary battery may be an allotrope of carbon such as graphite or coke. Note that a negative electrode active material formed of an allotrope of carbon can be used in a mixed or coated form with a metal, a metal salt, an oxide, or the like. Examples of negative electrode active materials that can be used also include oxides and sulfates of silicon, tin, zinc, manganese, iron, nickel, and the like; lithium metal; lithium alloys such as Li—Al, Li—Bi—Cd, and Li—Sn—Cd; lithium transition metal nitrides; and silicone.

The number-average particle diameter of the electrode active material is preferably 0.1 μm or more, and more preferably 1 μm or more, and is preferably 40 μm or less, and more preferably 30 μm or less. When the number-average particle diameter of the electrode active material is 0.1 μm or more, handling is facilitated, and adhesiveness of an obtained electrode mixed material layer can be sufficiently increased. On the other hand, when the number-average particle diameter of the electrode active material is 40 μm or less, sufficient surface area of the electrode active material can be ensured, and output characteristics of an all-solid-state secondary battery can be sufficiently improved.

The amount of the solid electrolyte contained in the slurry composition for an electrode mixed material layer is an amount such that the proportion constituted by the solid electrolyte among the total amount (100 mass %) of the electrode active material and the solid electrolyte is preferably 10 mass % or more, and more preferably 20 mass % or more, and is preferably 70 mass % or less, and more preferably 60 mass % or less. When the proportion constituted by the solid electrolyte is not less than any of the lower limits set forth above, sufficient ion conductivity can be ensured, the electrode active material can be effectively utilized, and the capacity of an all-solid-state secondary battery can be sufficiently increased. Moreover, when the proportion constituted by the solid electrolyte is not more than any of the upper limits set forth above, a sufficient amount of the electrode active material can be ensured, and the capacity of an all-solid-state secondary battery can be sufficiently increased.

<<Binder>>

The binder contained in the slurry composition for an electrode mixed material layer includes at least the polymer A described above in the "Binder composition for all-solid-state secondary battery" section.

The amount of the polymer A that is contained in the slurry composition for an electrode mixed material layer per 100 parts by mass of the solid electrolyte is preferably 0.1 parts by mass or more, and more preferably 0.5 parts by mass or more, and is preferably 7 parts by mass or less, and more preferably 5 parts by mass or less. When the content of the polymer A in the slurry composition for an electrode mixed material layer is 0.1 parts by mass or more per 100 parts by mass of the solid electrolyte, the solid electrolyte can be sufficiently well dispersed in the slurry composition for an electrode mixed material layer, and output characteristics and high-temperature cycle characteristics of an all-solid-state secondary battery can be further improved. On the other hand, when the content of the polymer A in the slurry composition for an electrode mixed material layer is 7 parts by mass or less per 100 parts by mass of the solid electrolyte, impairment of battery reactions due to the polymer A serving as the binder can be inhibited.

<<Optional Components and Solvent>>

No specific limitations are placed on the optional components and the solvent. Any of the components given as examples of "other components" in the "Binder composition for all-solid-state secondary battery" section can, for example, be used as optional components. Moreover, any of the solvents given as examples in the "Binder composition for all-solid-state secondary battery" section can, for example, be used as the solvent.

<<Production Method of Slurry Composition for Electrode Mixed Material Layer>>

The slurry composition for an electrode mixed material layer is obtained by mixing the components set forth above. The method by which the components of the slurry composition are mixed is not specifically limited and may be a method in which a mixing device of a stirring, shaking, rotary, or other type is used. Moreover, a method using a dispersing and kneading device such as a homogenizer, a ball mill, a bead mill, a sand mill, a roll mill, or a planetary kneader may be adopted, and a method using a planetary kneader (planetary centrifugal mixer, etc.), a ball mill, or a bead mill is preferable from a viewpoint that aggregation of the electrode active material and/or the solid electrolyte can be inhibited.

(Slurry Composition for all-Solid-State Secondary Battery Solid Electrolyte Layer)

The presently disclosed slurry composition for a solid electrolyte layer contains a solid electrolyte and the presently disclosed binder composition set forth above. More specifically, the presently disclosed slurry composition for a solid electrolyte layer is a composition in which a solid electrolyte, a binder including the previously described polymer A, and other optionally contained components (optional components) are dispersed and/or dissolved in a solvent.

When a solid electrolyte layer is produced using the presently disclosed slurry composition for a solid electrolyte layer, an all-solid-state secondary battery can be caused to display excellent output characteristics and high-temperature cycle characteristics as a result of the presently disclosed slurry composition for a solid electrolyte layer containing the presently disclosed binder composition.

<Solid Electrolyte>

Any of the same solid electrolytes as given as examples in the "Slurry composition for all-solid-state secondary battery electrode mixed material layer" section can be used as the solid electrolyte. Moreover, preferred examples, preferred properties, and so forth of the solid electrolyte contained in the slurry composition for a solid electrolyte layer are the same as the preferred examples, preferred properties, and so forth of the solid electrolyte contained in the slurry composition for an electrode mixed material layer.

<Binder>

The binder contained in the slurry composition for a solid electrolyte layer includes at least the polymer A described above in the "Binder composition for all-solid-state secondary battery" section.

The amount of the polymer A that is contained in the slurry composition for a solid electrolyte layer per 100 parts by mass of the solid electrolyte is preferably 0.1 parts by mass or more, and more preferably 0.5 parts by mass or more, and is preferably 7 parts by mass or less, more preferably 5 parts by mass or less, and even more preferably 3 parts by mass or less. When the content of the polymer A in the slurry composition for a solid electrolyte layer is 0.1 parts by mass or more per 100 parts by mass of the solid electrolyte, the solid electrolyte can be sufficiently well dispersed in the slurry composition for a solid electrolyte layer, and output characteristics and high-temperature cycle characteristics of an all-solid-state secondary battery can be further improved. On the other hand, when the content of the polymer A in the slurry composition for a solid electrolyte layer is 7 parts by mass or less per 100 parts by mass of the solid electrolyte, impairment of battery reactions due to the polymer A serving as the binder can be inhibited.

<<Optional Components and Solvent>>

No specific limitations are placed on the optional components and the solvent. Dispersants, leveling agents, defoamers, and the like given as examples of "other components" in the "Binder composition for all-solid-state secondary battery" section can, for example, be used as optional components. Moreover, any of the solvents given as examples in the "Binder composition for all-solid-state secondary battery" section can, for example, be used as the solvent.

(Electrode for all-Solid-State Secondary Battery)

The presently disclosed slurry composition for an electrode mixed material layer set forth above can be used to produce an electrode for an all-solid-state secondary battery. For example, the presently disclosed slurry composition for an electrode mixed material layer can be used to form an electrode mixed material layer on a current collector so as to obtain an electrode that includes a current collector and an electrode mixed material layer on the current collector. An electrode that includes an electrode mixed material layer formed from the presently disclosed slurry composition for an electrode mixed material layer can cause an all-solid-state secondary battery to display excellent output characteristics and high-temperature cycle characteristics.

<Current Collector>

The current collector is not specifically limited so long as it is a material having electrical conductivity and electrochemical durability, but is preferably a metal material such as iron, copper, aluminum, nickel, stainless steel, titanium, tantalum, gold, or platinum from a viewpoint of having heat resistance. Of these materials, aluminum is particularly preferable for a positive electrode, whereas copper is particularly preferable for a negative electrode. Although no specific limitations are placed on the shape of the current collector, the current collector preferably has a sheet shape of approximately 0.001 mm to 0.5 mm in thickness. The current collector is preferably subjected to surface roughening before use in order to increase adhesion strength with the electrode mixed material layer. The method of surface roughening may, for example, be a mechanical polishing method, an electrolytic polishing method, or a chemical polishing method. The mechanical polishing is performed, for example, using a coated abrasive to which abrasive grains are bonded, a whetstone, an emery wheel, or a wire brush including steel wire or the like. An intermediate layer may be formed on the surface of the current collector in order to increase electrical conductivity and/or adhesion strength of the current collector with the electrode mixed material layer.

<Electrode Mixed Material Layer>

The electrode mixed material layer is formed using the presently disclosed slurry composition for an electrode mixed material layer as previously described. Specifically, the electrode mixed material layer is formed of a dried product of the presently disclosed slurry composition for an electrode mixed material layer and contains at least a solid electrolyte, an electrode active material, and the polymer A as a binder. It should be noted that components contained in the electrode mixed material layer are components that were contained in the slurry composition for an electrode mixed material layer, and thus the preferred ratio of these components in the electrode mixed material layer is the same as the preferred ratio of the components in the slurry composition for an electrode mixed material layer.

<Production Method of Electrode for all-Solid-State Secondary Battery>

The electrode is produced, for example, through a step of applying the presently disclosed slurry composition for an electrode mixed material layer onto the current collector (application step) and a step of drying the slurry composition for an electrode mixed material layer that has been applied onto the current collector to form the electrode mixed material layer (drying step).

<<Application Step>>

The slurry composition for an electrode mixed material layer can be applied onto the current collector by any commonly known method without any specific limitations. Specific examples of application methods that can be used include doctor blading, dip coating, reverse roll coating, direct roll coating, gravure coating, extrusion coating, and brush coating.

The amount of the slurry composition for an electrode mixed material layer that is applied can be set as appropriate depending on the desired electrode mixed material layer thickness, for example, without any specific limitations.

<<Drying Step>>

The slurry composition for an electrode mixed material layer on the current collector can be dried by any commonly known method without any specific limitations. Specific examples of drying methods that can be used include drying by warm, hot, or low-humidity air, drying in a vacuum, and drying through irradiation with (far) infrared light, electron beams, or the like. The drying conditions are preferably adjusted such that the solvent is volatilized as quickly as possible under conditions with which cracks do not form in the electrode mixed material layer due to stress concentration and with which peeling of the electrode mixed material layer from the current collector does not occur.

Specifically, the drying temperature is preferably not lower than 50° C. and not higher than 250° C., and is preferably not lower than 80° C. and not higher than 200° C. When the drying temperature is within any of the ranges set forth above, thermal decomposition of the binder including the polymer A can be inhibited, and the electrode mixed material layer can be well formed. The drying time is not specifically limited but is normally not less than 10 minutes and not more than 60 minutes.

Also note that pressing of the electrode may be performed after drying in order to stabilize the electrode. The method of pressing may be mold pressing, calender pressing, or the like, but is not limited thereto.

The mass per unit area of the electrode mixed material layer in the electrode that is obtained as set forth above is not specifically limited but is preferably not less than 1.0 mg/cm$^2$ and not more than 20.0 mg/cm$^2$, and more preferably not less than 5.0 mg/cm$^2$ and not more than 15.0 mg/cm$^2$.

(Solid Electrolyte Layer for all-Solid-State Secondary Battery)

The presently disclosed slurry composition for a solid electrolyte layer set forth above can be used to produce a solid electrolyte layer. The solid electrolyte layer produced using the presently disclosed slurry composition for a solid electrolyte layer can cause an all-solid-state secondary battery to display excellent output characteristics and high-temperature cycle characteristics.

The solid electrolyte layer is formed using the presently disclosed slurry composition for a solid electrolyte layer as previously described. Specifically, the solid electrolyte layer is formed of a dried product of the presently disclosed slurry composition for a solid electrolyte layer and contains at least a solid electrolyte and the polymer A as a binder. It should be noted that components contained in the solid electrolyte layer are components that were contained in the slurry composition for a solid electrolyte layer, and thus the preferred ratio of these components in the solid electrolyte layer is the same as the preferred ratio of the components in the slurry composition for a solid electrolyte layer.

<Production Method of Solid Electrolyte Layer for all-Solid-State Secondary Battery>

Examples of methods by which the solid electrolyte layer may be formed include:

(1) a method in which the presently disclosed slurry composition for a solid electrolyte layer is applied onto an electrode (normally the surface of an electrode mixed material layer; same applies below) and is then dried to form a solid electrolyte layer on the electrode;

(2) a method in which the presently disclosed slurry composition for a solid electrolyte layer is applied onto a substrate and is dried, and then the resultant solid electrolyte layer is transferred onto an electrode to form a solid electrolyte layer on the electrode; and (3) a method in which the presently disclosed slurry composition for a solid electrolyte layer is applied onto a substrate and is dried to obtain a dried product of the slurry composition for a solid electrolyte layer that is subsequently pulverized to obtain a powder, and then the powder is molded into a layer form to form a self-supporting solid electrolyte layer.

Known methods can be adopted as the methods by which application, drying, transferring, pulverizing, molding, and so forth are performed in the above-described methods (1) to (3).

The thickness of the solid electrolyte layer obtained as set forth above is not specifically limited but is preferably not less than 10 μm and not more than 500 μm, more preferably not less than 20 μm and not more than 300 μm, and even more preferably not less than 30 μm and not more than 200 μm. When the thickness of the solid electrolyte layer is within any of the ranges set forth above, internal resistance of an all-solid-state secondary battery can be reduced, and the all-solid-state secondary battery can be caused to display even better output characteristics. Also note that short-circuiting of a positive electrode and a negative electrode inside an all-solid-state secondary battery can be sufficiently inhibited when the solid electrolyte layer has a thickness of 10 μm or more.

(All-Solid-State Secondary Battery)

The presently disclosed all-solid-state secondary battery includes either or both of: an electrode including an electrode mixed material layer formed using the presently disclosed slurry composition for an electrode mixed material layer set forth above; and a solid electrolyte layer formed using the presently disclosed slurry composition for a solid electrolyte layer set forth above. Specifically, the presently disclosed all-solid-state secondary battery includes a positive electrode including a positive electrode mixed material layer, a negative electrode including a negative electrode mixed material layer, and a solid electrolyte layer, and at least one selected from the group consisting of the positive electrode mixed material layer, the negative electrode mixed material layer, and the solid electrolyte layer is formed using a slurry composition for a solid electrolyte-containing layer (slurry composition for an electrode mixed material layer or slurry composition for a solid electrolyte layer) that contains the presently disclosed binder composition set forth above.

The presently disclosed all-solid-state secondary battery has excellent battery characteristics such as output characteristics and high-temperature cycle characteristics as a result of at least one of the positive electrode mixed material layer, the negative electrode mixed material layer, and/or the solid electrolyte layer containing the polymer A as a binder originating from the presently disclosed binder composition.

Note that any electrode that does not include an electrode mixed material layer formed using the presently disclosed slurry composition for an electrode mixed material layer can be used in the presently disclosed all-solid-state secondary battery without any specific limitations as an electrode (positive electrode or negative electrode) other than an electrode that includes an electrode mixed material layer formed using the presently disclosed slurry composition for an electrode mixed material layer.

Moreover, any solid electrolyte layer that is not formed using the presently disclosed slurry composition for a solid electrolyte layer can be used in the presently disclosed all-solid-state secondary battery without any specific limitations as a solid electrolyte layer other than a solid electrolyte layer that is formed using the presently disclosed slurry composition for a solid electrolyte layer.

Furthermore, the presently disclosed all-solid-state secondary battery can be obtained by stacking the positive electrode and the negative electrode such that the positive electrode mixed material layer of the positive electrode and the negative electrode mixed material layer of the negative electrode are in opposition via the solid electrolyte layer and optionally performing pressing thereof to obtain a laminate, subsequently placing the laminate in a battery container in that form or after rolling, folding, or the like, depending on the battery shape, and then sealing the battery container. Note that pressure increase inside the battery and the occurrence of overcharging or overdischarging can be prevented by placing an expanded metal, an overcurrent preventing device such as a fuse or a PTC device, a lead plate, or the like in the battery container as necessary. The shape of the battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

In the examples and comparative examples, the following methods were used to measure or evaluate the Mooney viscosity ($ML_{1+4}$, 100° C.), chemical composition, and iodine value of a polymer, the adhesiveness and flexural resistance of a negative electrode mixed material layer, and the output characteristics and high-temperature cycle characteristics of an all-solid-state secondary battery.

<Mooney Viscosity ($ML_{1+4}$, 100° C.)>

After coagulating a water dispersion of a polymer in methanol, vacuum drying was performed at a temperature of 60° C. for 12 hours to obtain a dry polymer. The Mooney viscosity at a temperature of 100° C. was measured in accordance with JIS K6300-1 using 40 g of the obtained dry polymer.

<Chemical Composition>

After coagulating 100 g of a water dispersion of a polymer in 1 L of methanol, vacuum drying was performed at a temperature of 60° C. for 12 hours to obtain a dry polymer. The obtained dry polymer was analyzed by $^1$H-NMR, and the proportional content (mass %) of each repeating unit (monomer unit) included in the polymer was calculated based on peak areas in the obtained spectrum.

<Iodine Value>

After coagulating 100 g of a water dispersion of a polymer in 1 L of methanol, vacuum drying was performed at a temperature of 60° C. for 12 hours to obtain a dry polymer. The iodine value of the obtained dry polymer was measured in accordance with JIS K6235(2006).

<Adhesiveness>

A negative electrode was cut out with a rectangular shape of 1.0 cm in width by 10 cm in length to obtain a test specimen. Next, the test specimen was placed with the negative electrode mixed material layer surface thereof facing downward, cellophane tape (tape prescribed by JIS Z1522) was affixed to the negative electrode mixed material layer surface, and then the stress was measured when the cellophane tape was peeled off in a direction at 1800 from one end of the test specimen at a speed of 50 mm/min. A total of 10 measurements were performed in this manner and an average value thereof was determined. The average value was taken to be the peel strength (N/m) and was evaluated by the following standard. A larger value for the peel strength indicates that the negative electrode mixed material layer is more strongly adhered to the current collector.

A: Peel strength of 20.0 N/m or more
B: Peel strength of not less than 15.0 N/m and less than 20.0 N/m
C: Peel strength of not less than 10.0 N/m and less than 15.0 N/m
D: Peel strength of less than 10.0 N/m <Flexural Resistance>

A negative electrode was subjected to a flexibility test in accordance with the mandrel test method (JIS K 5600 (1999)). Specifically, the negative electrode was wound around mandrels having diameters of 5.0 mm, 4.0 mm, and 3.0 mm with the negative electrode mixed material layer thereof at the outside. After this winding, the occurrence of cracking at the negative electrode mixed material layer surface was inspected using a digital microscope and was evaluated by the following standard. When cracking occurs at a smaller mandrel diameter, this indicates that the negative electrode mixed material layer has better flexural resistance, and when cracking does not occur even when a mandrel having a diameter of 3.0 mm is used, this indicates that the negative electrode mixed material layer has especially good flexural resistance.

A: Cracking does not occur even at diameter of 3.0 mm
B: Cracking occurs at diameter of 3.0 mm but does not occur at diameter of 4.0 mm
C: Cracking occurs at diameter of 4.0 mm but does not occur at diameter of 5.0 mm
D: Cracking occurs at diameter of 5.0 mm <Output Characteristics>

Ten all-solid-state secondary battery cells were charged to 4.3 V by a 0.1 C constant-current method, were subsequently discharged to 3.0 V at 0.1 C, and the 0.1 C discharge capacity was determined. Next, charging was performed to 4.3 V at 0.1 C, discharging was subsequently performed to 3.0 V at 5 C, and the 5 C discharge capacity was determined. An average value of the 0.1 C discharge capacity for ten cells was taken to be a discharge capacity a, an average value of the 5 C discharge capacity for ten cells was taken to be a discharge capacity b, and a ratio (capacity ratio) of the discharge capacity b relative to the discharge capacity a (=discharge capacity b/discharge capacity a×100(%)) was determined and was evaluated by the following standard. A larger value for the capacity ratio indicates better output characteristics.

A: Capacity ratio of 50% or more
B: Capacity ratio of not less than 40% and less than 50%
C: Capacity ratio of not less than 30% and less than 40%
D: Capacity ratio of less than 30%

<High-Temperature Cycle Characteristics>

An obtained all-solid-state secondary battery was subjected to 100 charge/discharge cycles of charging from 3 V to 4.3 V at 0.1 C and discharging from 4.3 V to 3 V at 0.1 C with a temperature of 60° C. A value obtained by calculating the proportion of the 0.1 C discharge capacity of the $100^{th}$ cycle relative to the 0.1 C discharge capacity of the $5^{th}$ cycle as a percentage was taken to be a capacity maintenance rate and was evaluated by the following standard. A larger value for the capacity maintenance rate indicates a smaller decrease of discharge capacity and better high-temperature cycle characteristics.

A: Capacity maintenance rate of 60% or more
B: Capacity maintenance rate of not less than 50% and less than 60%
C: Capacity maintenance rate of not less than 40% and less than 50%
D: Capacity maintenance rate of not less than 30% and less than 40%

Example 1

<Production of Binder Composition Containing Polymer A>

A reactor having a capacity of 10 L was charged with 100 parts of deionized water, 20 parts of acrylonitrile as a nitrile group-containing monomer, and 80 parts of 1,3-butadiene as an aliphatic conjugated diene monomer, and was further charged with 2 parts of potassium oleate as an emulsifier, 0.1 parts of potassium phosphate as a stabilizer, and 0.5 parts of 2,2',4,6,6'-pentamethylheptane-4-thiol (TIBM) as a molecular weight modifier. Next, 0.35 parts of potassium persulfate as a polymerization initiator was added to the reaction liquid, and emulsion polymerization was performed at 30° C. to copolymerize 1,3-butadiene and acrylonitrile.

At the point at which the polymerization conversion rate reached 90%, 0.2 parts of hydroxylamine sulfate was added into the reactor to end the polymerization. Thereafter, heating was performed, water vapor was distilled and residual monomer was collected under reduced pressure at approximately 70° C., and then 2 parts of an alkylated phenol as an antioxidant was added to yield a water dispersion of a polymer A (copolymer of 1,3-butadiene and acrylonitrile).

The system was subsequently converted to a nitrogen atmosphere, and the water dispersion was concentrated to a solid content concentration of 40% at normal temperature using an evaporator. The water dispersion of the polymer A that had been concentrated was used to measure the Mooney viscosity, chemical composition, and iodine value of the polymer A. The results are shown in Table 1.

In addition, a binder composition (solid content concentration: 8% to 10%) containing the polymer A and xylene was obtained by adding xylene to the water dispersion of the polymer A that had been concentrated and then evaporating water therefrom under reduced pressure.

<Binder Composition Containing Polymer B>

A water dispersion of a polymer was obtained in the same way as the binder composition containing the polymer A described above with the exception that the amount of acrylonitrile was changed to 22 parts and the amount of 1,3-butadiene was changed to 78 parts. Upon measurement of the chemical composition of the polymer using the obtained water dispersion of the polymer, the polymer comprised 22% of acrylonitrile units and 78% of 1,3-butadiene units.

Next, 400 mL (total solid content: 48 g) of the obtained water dispersion of the polymer was loaded into a 1 L autoclave equipped with a stirrer, and nitrogen gas was passed for 10 minutes to remove dissolved oxygen in the water dispersion. Thereafter, 50 mg of palladium acetate as a hydrogenation reaction catalyst was dissolved in 180 mL of water to which nitric acid had been added in an amount of 4 molar equivalents relative to the Pd, and was added into the autoclave. The system was purged twice with hydrogen gas and then the contents of the autoclave were heated to 50° C. in a state of pressurization to 3 MPa with hydrogen gas, and a hydrogenation reaction was carried out for 6 hours to yield a water dispersion of a polymer B (hydrogenated nitrile rubber).

The system was subsequently converted to a nitrogen atmosphere, and the water dispersion was concentrated to a solid content concentration of 40% at normal temperature using an evaporator. Upon measurement of the Mooney viscosity and iodine value of the polymer B using the water dispersion of the polymer B that had been concentrated, the polymer B had a Mooney viscosity of 70 and an iodine value of 7. Note that from this iodine value, the proportional content of aliphatic conjugated diene monomer units (1,3-butadiene units) in the polymer B was confirmed to be less than 40 mass %.

In addition, a binder composition (solid content concentration: 8% to 10%) containing the polymer B and xylene was obtained by adding xylene to the water dispersion of the polymer B that had been concentrated and then evaporating water therefrom under reduced pressure.

<Production of Slurry Composition for Negative Electrode Mixed Material Layer>

A mixture was obtained by mixing 100 parts of graphite (number-average particle diameter: 20 μm) as a negative electrode active material, 50 parts of sulfide glass formed of $Li_2S$ and $P_2S_5$ ($Li_2S/P_2S_5$=70 mol %/30 mol %; number-average particle diameter: 0.4 μm) as a solid electrolyte, and 3 parts (in terms of solid content) of the binder composition containing the polymer A, and then xylene was added to the mixture to produce a composition having a solid content concentration of 65%. This composition was mixed by a planetary centrifugal mixer and was further adjusted to a solid content concentration of 60% with xylene to obtain a slurry composition for a negative electrode mixed material layer.

<Production of Slurry Composition for Positive Electrode Mixed Material Layer>

A mixture was obtained by mixing 100 parts of an active material NMC532 based on a lithium complex oxide of Co—Ni—Mn ($LiNi_{5/10}Co_{2/10}Mn_{3/10}O_2$; number-average particle diameter: 10.0 μm) as a positive electrode active material, 50 parts of sulfide glass formed of $Li_2S$ and $P_2S_5$ ($Li_2S/P_2S_5$=70 mol %/30 mol %; number-average particle diameter: 0.4 μm) as a solid electrolyte, 3 parts of acetylene black as a conductive material, and 2 parts (in terms of solid content) of the binder composition containing the polymer B, and then xylene was added to the mixture to produce a composition having a solid content concentration of 75%. This composition was mixed by a planetary centrifugal mixer and was further adjusted to a solid content concentration of 70% with xylene to obtain a slurry composition for a positive electrode mixed material layer.

<Production of Solid Electrolyte Layer>

A mixture was obtained by mixing 100 parts of sulfide glass formed of $Li_2S$ and $P_2S_5$ ($Li_2S/P_2S_5$=70 mol %/30 mol %; number-average particle diameter: 0.4 μm) as a solid electrolyte and 2 parts (in terms of solid content) of the binder composition containing the polymer B, and then xylene was added to the mixture to produce a composition having a solid content concentration of 60%. This composition was mixed by a planetary centrifugal mixer to obtain a slurry composition for a solid electrolyte layer. The slurry composition for a solid electrolyte layer was dried on a release sheet serving as a substrate, and the resultant dried product was peeled from the release sheet and was ground in a mortar to obtain a powder. Next, 0.05 mg of the obtained powder was loaded into a mold of 10 mm in diameter and was molded with a pressure of 200 MPa to obtain a pellet (solid electrolyte layer) of 500 μm in thickness.

<Production of Negative Electrode>

The slurry composition for a negative electrode mixed material layer was applied onto the surface of copper foil serving as a current collector and was dried at 120° C. for 20 minutes to obtain a negative electrode including a negative electrode mixed material layer (mass per unit area: 10.0 mg/cm$^2$) at one side of the copper foil serving as a current collector.

This negative electrode was used to evaluate adhesiveness and flexural resistance. The results are shown in Table 1.

<Production of Positive Electrode>

The slurry composition for a positive electrode mixed material layer was applied onto the surface of aluminum foil serving as a current collector and was dried at 120° C. for 30 minutes to obtain a positive electrode including a positive electrode mixed material layer (mass per unit area: 18.0 mg/cm$^2$) at one side of the aluminum foil serving as a current collector.

<Production of all-Solid-State Secondary Battery>

The negative electrode and the positive electrode obtained as described above were each punched out with a diameter of 10 mm. The solid electrolyte layer obtained as described above was sandwiched between the punched positive electrode and negative electrode (sandwiched with the electrode mixed material layers of the electrodes in contact with the solid electrolyte layer) and was then pressed with a pressure of 200 MPa to obtain a laminate for an all-solid-state secondary battery. The obtained laminate was arranged inside an evaluation cell (confining pressure: 40 MPa) to obtain an all-solid-state secondary battery. The output characteristics and high-temperature cycle characteristics of the obtained all-solid-state secondary battery were evaluated. The results are shown in Table 1.

Examples 2 to 4

Binder compositions (polymers A and B), a slurry composition for a negative electrode mixed material layer, a slurry composition for a positive electrode mixed material layer, a slurry composition for a solid electrolyte layer, a solid electrolyte layer, a negative electrode, a positive electrode, and an all-solid-state secondary battery were produced, and measurements and evaluations were performed in the same way as in Example 1 with the exception that the amounts of acrylonitrile and 1,3-butadiene used to produce the polymer A were changed to 12 parts and 88 parts (Example 2), 27 parts and 73 parts (Example 3), or 8 parts and 92 parts (Example 4) in production of the binder composition containing the polymer A. The results are shown in Table 1.

Examples 5 and 6

Binder compositions (polymers A and B), a slurry composition for a negative electrode mixed material layer, a slurry composition for a positive electrode mixed material layer, a slurry composition for a solid electrolyte layer, a solid electrolyte layer, a negative electrode, a positive electrode, and an all-solid-state secondary battery were produced, and measurements and evaluations were performed in the same way as in Example 1 with the exception that the amount of the molecular weight modifier (TIBM) used to produce the polymer A was changed to 0.33 parts (Example 5) or 0.15 parts (Example 6) in production of the binder composition containing the polymer A. The results are shown in Table 1.

Example 7

Binder compositions (polymers A and B), a slurry composition for a negative electrode mixed material layer, a slurry composition for a positive electrode mixed material layer, a slurry composition for a solid electrolyte layer, a solid electrolyte layer, a negative electrode, a positive electrode, and an all-solid-state secondary battery were produced, and measurements and evaluations were performed in the same way as in Example 1 with the exception that 20 parts of acrylonitrile as a nitrile group-containing monomer, 60 parts of 1,3-butadiene as an aliphatic conjugated diene monomer, and 20 parts of n-butyl acrylate as an ethylenically unsaturated carboxylic acid ester monomer were used as monomers for producing the polymer A, and the amount of the molecular weight modifier (TIBM) used to produce the polymer A was changed to 0.30 parts in production of the binder composition containing the polymer A. The results are shown in Table 1.

Example 8

Binder compositions (polymers A and B), a slurry composition for a negative electrode mixed material layer, a slurry composition for a positive electrode mixed material layer, a slurry composition for a solid electrolyte layer, a solid electrolyte layer, a negative electrode, a positive electrode, and an all-solid-state secondary battery were produced, and measurements and evaluations were performed in the same way as in Example 7 with the exception that n-butyl acrylate used as an ethylenically unsaturated carboxylic acid ester monomer was changed to ethyl acrylate in production of the binder composition containing the polymer A. The results are shown in Table 1.

Example 9

Binder compositions (polymers A and B), a slurry composition for a negative electrode mixed material layer, a slurry composition for a positive electrode mixed material layer, a slurry composition for a solid electrolyte layer, a solid electrolyte layer, a negative electrode, a positive electrode, and an all-solid-state secondary battery were produced, and measurements and evaluations were performed in the same way as in Example 1 with the exception that the binder composition containing the polymer A was used instead of the binder composition containing the polymer B in production of the solid electrolyte layer. The results are shown in Table 2.

Examples 10 and 11

Binder compositions (polymers A and B), a slurry composition for a negative electrode mixed material layer, a slurry composition for a positive electrode mixed material layer, a slurry composition for a solid electrolyte layer, a solid electrolyte layer, a negative electrode, a positive electrode, and an all-solid-state secondary battery were produced, and measurements and evaluations were performed in the same way as in Example 1 with the exception that diisobutyl ketone (Example 10) or n-butyl ether (Example 11) was used instead of xylene in production of the binder composition containing the polymer A and the slurry composition for a negative electrode mixed material layer. The results are shown in Table 2.

Comparative Examples 1 and 2

Binder compositions (polymers A and B), a slurry composition for a negative electrode mixed material layer, a slurry composition for a positive electrode mixed material layer, a slurry composition for a solid electrolyte layer, a solid electrolyte layer, a negative electrode, a positive electrode, and an all-solid-state secondary battery were produced, and measurements and evaluations were performed in the same way as in Example 1 with the exception that the amounts of acrylonitrile and 1,3-butadiene used to produce the polymer A were changed to 35 parts and 65 parts (Comparative Example 1) or 2 parts and 98 parts (Comparative Example 2) in production of the binder composition containing the polymer A. The results are shown in Table 2.

Comparative Example 3

A binder composition containing a polymer B, a slurry composition for a negative electrode mixed material layer, a slurry composition for a positive electrode mixed material layer, a slurry composition for a solid electrolyte layer, a solid electrolyte layer, a negative electrode, a positive electrode, and an all-solid-state secondary battery were produced, and measurements and evaluations were performed in the same way as in Example 1 with the exception that a binder composition containing a polymer A was not produced, and the binder composition containing the polymer B was used instead of the binder composition containing the polymer A in production of the slurry composition for a negative electrode mixed material layer. The results are shown in Table 2.

Comparative Example 4

A binder composition containing a polymer B, a slurry composition for a negative electrode mixed material layer, a slurry composition for a positive electrode mixed material layer, a slurry composition for a solid electrolyte layer, a solid electrolyte layer, a negative electrode, a positive electrode, and an all-solid-state secondary battery were produced, and measurements and evaluations were performed in the same way as in Example 1 with the exception that a binder composition containing a polymer A was not produced, and a binder composition containing nitrile rubber produced as described below was used instead of the binder composition containing the polymer A in production of the slurry composition for a negative electrode mixed material layer. The results are shown in Table 2.

<Production of Binder Composition Containing Nitrile Rubber>

A binder composition (solid content concentration: 8% to 10%) containing nitrile rubber and xylene was obtained in the same way as the previously described binder composition containing the polymer A with the exception that the amounts of acrylonitrile and 1,3-butadiene were changed to 22 parts and 78 parts, and the amount of the molecular weight modifier (TIBM) was changed to 0.37 parts. Note that upon measurement of the Mooney viscosity, iodine value, and chemical composition of the nitrile rubber, the nitrile rubber had a Mooney viscosity of 50, an iodine value of 366, and comprised 22% of acrylonitrile units and 78% of 1,3-butadiene units.

In Tables 1 and 2, shown below:
"AN" indicates acrylonitrile unit;
"BD" indicates 1,3-butadiene unit;
"H-BD" indicates repeating unit obtained through hydrogenation of 1,3-butadiene unit;
"BA" indicates n-butyl acrylate unit;
"EA" indicates ethyl acrylate unit;
"DIK" indicates diisobutyl ketone;
"BE" indicates n-butyl ether;
"Negative electrode" indicates negative electrode mixed material layer; and
"Solid electrolyte" indicates solid electrolyte layer.

TABLE 1

| | | | | | Example 1 | Example 2 | Example 3 | Example 4 | Example 5 | Example 6 | Example 7 | Example 8 |
|---|---|---|---|---|---|---|---|---|---|---|---|---|
| Binder composition | Polymer A, etc. | Chemical composition | Nitrile group-containing monomer unit | Type | AN | AN | AN | AN | AN | AN | AN | AN |
| | | | | Proportional content [mass %] | 20 | 12 | 27 | 8 | 20 | 20 | 20 | 20 |
| | | | Aliphatic conjugated diene monomer unit, etc. | Type | BD | BD | BD | BD | BD | BD | BD | BD |
| | | | | Proportional content [mass %] | 80 | 88 | 73 | 92 | 80 | 80 | 60 | 60 |
| | | | Ethylenically unsaturated carboxylic acid ester monomer unit | Type | — | — | — | — | — | — | BA | EA |
| | | | | Proportional content [mass %] | — | — | — | — | — | — | 20 | 20 |
| | | Properties | Mooney viscosity [—] | | 75 | 75 | 75 | 75 | 65 | 160 | 80 | 80 |
| | | | Iodine value [mg/100 mg] | | 372 | 409 | 340 | 427 | 372 | 372 | 280 | 280 |
| | Solvent | | | | Xylene | Xylene | Xylene | Xylene | Xylene | Xylene | Xylene | Xylene |
| Solid electrolyte-containing layer in which polymer A, etc., is contained | | | | | Negative electrode | Negative electrode | Negative electrode | Negative electrode | Negative electrode | Negative electrode | Negative electrode | Negative electrode |
| Adhesiveness | | | | | A | A | A | B | B | B | A | A |
| Flexural resistance | | | | | A | A | A | A | A | B | A | A |
| Output characteristics | | | | | A | A | B | B | B | B | A | A |
| High-temperature cycle characterisitics | | | | | A | A | B | B | B | B | A | A |

| | | | | | | Example 9 | Example 10 | Example 11 | Comparative Example 1 | Comparative Example 2 | Comparative Example 3 | Comparative Example 4 |
|---|---|---|---|---|---|---|---|---|---|---|---|---|
| Binder composition | Polymer A, etc. | Chemical composition | Nitrile group-containing monomer unit | Type | AN | AN | AN | AN | AN | AN | AN | |
| | | | | Proportional content [mass %] | 20 | 20 | 20 | 35 | 2 | 22 | 22 |
| | | | Aliphatic conjugated diene monomer unit, etc. | Type | BD | BD | BD | BD | BD | H-BD | BD |
| | | | | Proportional content [mass %] | 80 | 80 | 80 | 65 | 98 | 78* | 78 |
| | | | Ethylenically unsaturated carboxylic acid ester monomer unit | Type | — | — | — | — | — | — | — |
| | | | | Proportional content [mass %] | — | — | — | — | — | — | — |
| | | Properties | Mooney viscosity [—] | | 75 | 75 | 75 | 75 | 75 | 70 | 50 |
| | | | Iodine value [mg/100 mg] | | 372 | 372 | 372 | 303 | 455 | 7 | 366 |
| | Solvent | | | | Xylene | DIK | BE | Xylene | Xylene | Xylene | Xylene |
| Solid electrolyte-containing layer in which polymer A, etc., is contained | | | | | Negative electrode/ Solid electrolyte | Negative electrode | Negative electrode | Negative electrode | Negative electrode | Negative electrode | Negative electrode |
| Adhesiveness | | | | | A | C | B | D | C | C | D |
| Flexural resistance | | | | | A | B | B | D | C | C | D |
| Output characteristics | | | | | A | B | B | D | D | C | C |
| High-temperature cycle characteristics | | | | | A | B | B | D | D | C | C |

*Proportional content of monomer unit before hydrogenation

It can be seen from Tables 1 and 2 that a negative electrode mixed material layer having excellent adhesiveness and flexural resistance was obtained and an all-solid-state secondary battery having excellent output characteristics and high-temperature cycle characteristics was obtained in Examples 1 to 11 in which a polymer A including a nitrile group-containing monomer unit and an aliphatic conjugated diene monomer unit in proportions within specific ranges and having a Mooney viscosity of not less than a specific value was used as a binder.

On the other hand, it can be seen from Table 2 that adhesiveness and flexural resistance of a negative electrode mixed material layer decreased and output characteristics and high-temperature cycle characteristics of an all-solid-state secondary battery deteriorated in Comparative Examples 1 to 3 in which a polymer for which the proportional content of either or both of a nitrile group-containing monomer unit and an aliphatic conjugated diene monomer unit was outside of a specific range was used as a binder, and in Comparative Example 4 in which a polymer having a Mooney viscosity of not more than a specific value was used as a binder.

INDUSTRIAL APPLICABILITY

According to the present disclosure, it is possible to provide a binder composition for an all-solid-state secondary battery with which it is possible to form a solid electrolyte-containing layer that can cause an all-solid-state secondary battery to display excellent output characteristics and high-temperature cycle characteristics.

Moreover, according to the present disclosure, it is possible to provide a slurry composition for an all-solid-state secondary battery electrode mixed material layer with which it is possible to form an electrode mixed material layer that can cause an all-solid-state secondary battery to display excellent output characteristics and high-temperature cycle characteristics.

Furthermore, according to the present disclosure, it is possible to provide a slurry composition for an all-solid-state secondary battery solid electrolyte layer with which it is possible to form a solid electrolyte layer that can cause an all-solid-state secondary battery to display excellent output characteristics and high-temperature cycle characteristics.

Also, according to the present disclosure, it is possible to provide an all-solid-state secondary battery having excellent output characteristics and high-temperature cycle characteristics.

The invention claimed is:

1. A binder composition for an all-solid-state secondary battery comprising a polymer A, wherein
the polymer A includes a nitrile group-containing monomer unit and an aliphatic conjugated diene monomer unit, with proportional content of the nitrile group-containing monomer unit in the polymer A being not less than 5 mass % and not more than 30 mass %, and proportional content of the aliphatic conjugated diene monomer unit in the polymer A being not less than 40 mass % and not more than 95 mass %,
the polymer A has an iodine value of 250 mg/100 mg or more, and
the polymer A has a Mooney viscosity ($ML_{1+4}$, 100° C.) of 65 or more.

2. The binder composition for an all-solid-state secondary battery according to claim 1, wherein proportional content of an ethylenically unsaturated carboxylic acid ester monomer unit in the polymer A is not less than 0 mass % and not more than 50 mass %.

3. The binder composition for an all-solid-state secondary battery according to claim 1, further comprising a solvent, wherein the solvent includes either or both of xylene and butyl butyrate.

4. A slurry composition for an all-solid-state secondary battery electrode mixed material layer comprising: a solid electrolyte; an electrode active material; and the binder composition for an all-solid-state secondary battery according to claim 1.

5. The slurry composition for an all-solid-state secondary battery electrode mixed material layer according to claim 4, wherein the solid electrolyte is an amorphous sulfide containing Li and P.

6. The slurry composition for an all-solid-state secondary battery electrode mixed material layer according to claim 4, wherein the solid electrolyte is sulfide glass formed of $Li_2S$ and $P_2S_5$.

7. A slurry composition for an all-solid-state secondary battery solid electrolyte layer comprising: a solid electrolyte; and the binder composition for an all-solid-state secondary battery according to claim 1.

8. The slurry composition for an all-solid-state secondary battery solid electrolyte layer according to claim 7, wherein the solid electrolyte is an amorphous sulfide containing Li and P.

9. The slurry composition for an all-solid-state secondary battery solid electrolyte layer according to claim 7, wherein the solid electrolyte is sulfide glass formed of $Li_2S$ and $P_2S_5$.

10. An all-solid-state secondary battery comprising an electrode including an electrode mixed material layer formed using the slurry composition for an all-solid-state secondary battery electrode mixed material layer according to claim 4.

11. An all-solid-state secondary battery comprising a solid electrolyte layer formed using the slurry composition for an all-solid-state secondary battery solid electrolyte layer according to claim 7.

* * * * *